US005523820A

United States Patent [19]
Mooney et al.

[11] Patent Number: 5,523,820
[45] Date of Patent: Jun. 4, 1996

[54] MULTIFORMAT FILM CLAMP

[75] Inventors: John E. Mooney, Rochester; Thomas F. Gillette, Caledonia, both of N.Y.

[73] Assignee: Eastman Kodak Company, Rochester, N.Y.

[21] Appl. No.: 331,300

[22] Filed: Oct. 28, 1994

Related U.S. Application Data

[63] Continuation of Ser. No. 74,894, Jun. 10, 1993, abandoned.

[51] Int. Cl.$^6$ .................................................. G03B 27/62
[52] U.S. Cl. ............................ 355/76; 355/74; 355/75; 352/221; 352/227
[58] Field of Search .................................. 352/221, 223, 352/227; 355/74, 75, 76

[56] References Cited

U.S. PATENT DOCUMENTS

| | | | |
|---|---|---|---|
| 2,248,646 | 7/1941 | Small | 88/24 |
| 2,824,491 | 2/1958 | Small | 88/24 |
| 4,161,365 | 7/1979 | Anderson et al. | 355/75 |
| 4,736,228 | 4/1988 | Ito | 355/75 |
| 4,835,555 | 5/1989 | Maxwell | 352/227 |
| 4,965,632 | 10/1990 | Jadrich et al. | 355/76 |
| 5,073,022 | 12/1991 | Pistor et al. | 352/223 |
| 5,258,807 | 11/1993 | Reinhe | 355/76 |

FOREIGN PATENT DOCUMENTS

| | | | |
|---|---|---|---|
| 0578111 | 6/1993 | European Pat. Off. | G03B 27/62E2 |
| 1012520 | 7/1957 | Germany | G03B 27/62E2 |
| 452071 | 11/1987 | Sweden | G03B 1/48 |

OTHER PUBLICATIONS

U.S. Ser. No.07/906,635, entitled "Multiformat Film Clamp", filed Jun. 30, 1992. Inventor: Stephen M. Reinke.

*Primary Examiner*—Michael L. Gellner
*Assistant Examiner*—Daniel P. Malley
*Attorney, Agent, or Firm*—David M. Woods

[57] ABSTRACT

The improved film clamp comprises a base plate having an aperture defined therethrough and over which a film strip is positioned in a plane; a platen having a flat surface and an aperture defined therein and mounted to said base plate with the apertures of said base plate and said platen aligned with each other when the platen is clamped to the base plate; and flexible gripping means positioned around the periphery of the aperture of either said platen, said base plate or both, each of said flexible gripping means including a locating section arranged so as to be inserted into locating slots provided around the periphery of the aperture of either said platen, said base plate or both, said locating slots being, when said base plate and said platen are clamped together, substantially perpendicular to the plane of the film strip and a gripping section angled with respect to said locating section outward from the aperture(s) so as to grip and tension said film strip between said base plate and said platen when they are clamped together.

20 Claims, 7 Drawing Sheets

FIG. 5
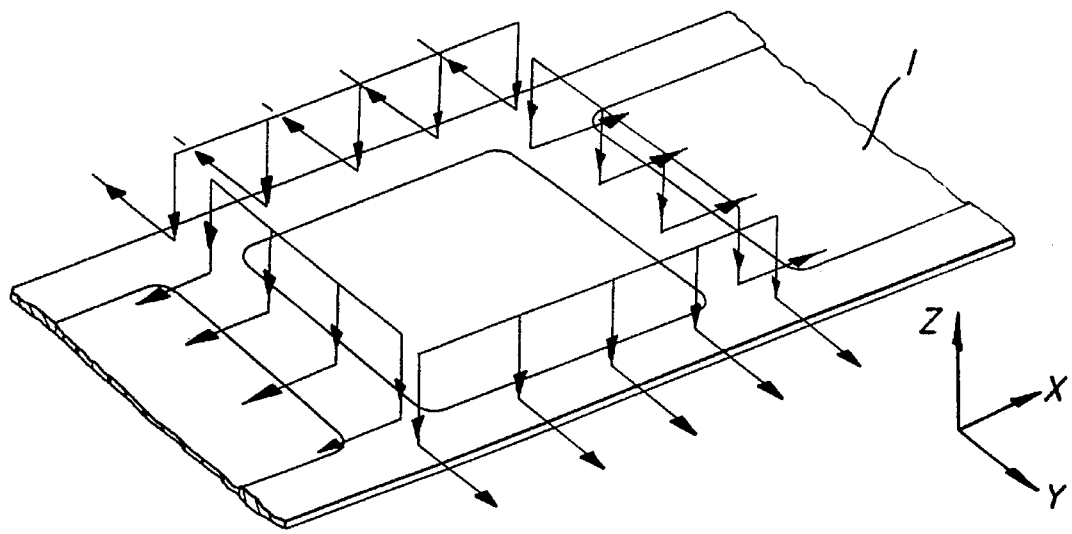
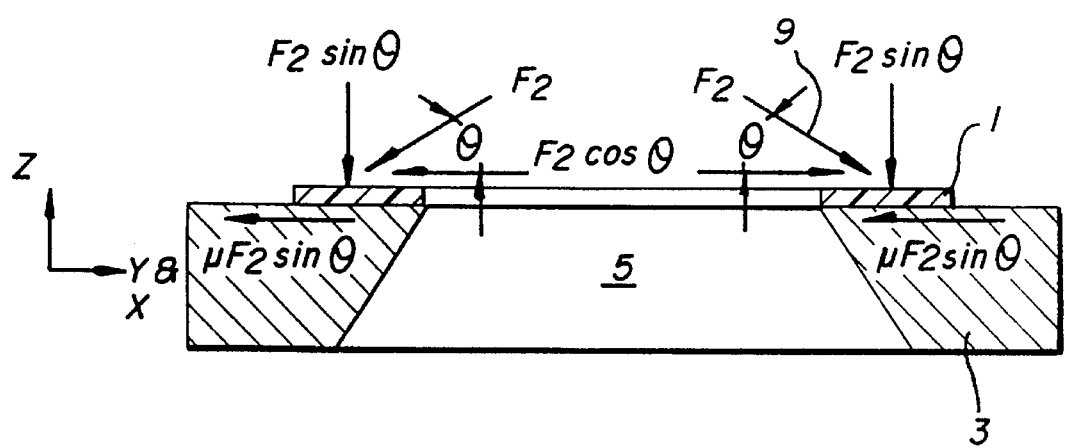
FIG. 6

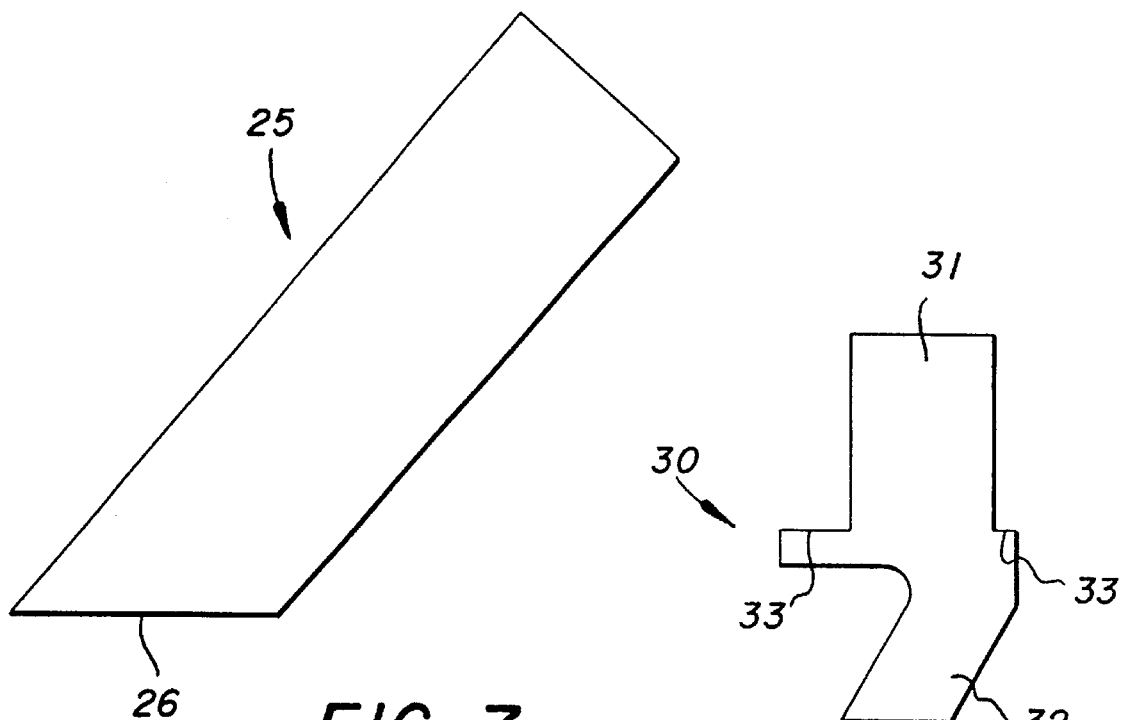
FIG. 7
PRIOR ART
FIG. 8
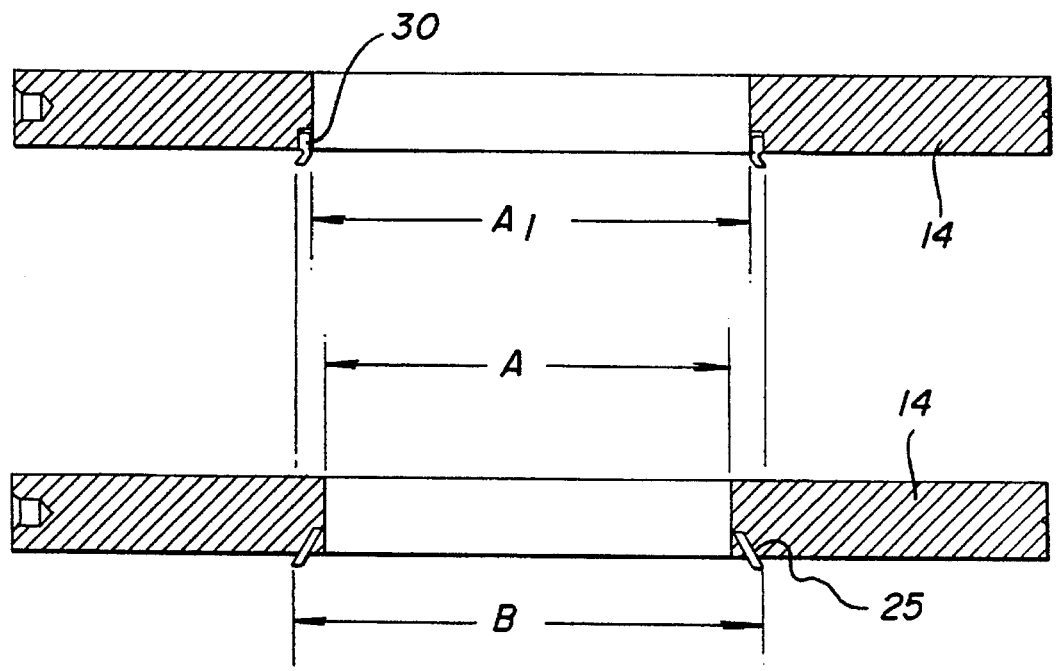
FIG. 10

MULTIFORMAT FILM CLAMP

This is a continuation of application Ser. No. 08/074,894, filed Jun. 10, 1993, abandoned.

CROSS-REFERENCE TO RELATED APPLICATION

Reference is made to commonly assigned copending application Ser. No. 906,635 filed on Jun. 30, 1992, entitled "Multiformat Film Clamp" and filed in the name of Eastman Kodak Company.

FIELD OF THE INVENTION

The present invention relates to an improved film clamp for use in apparatus such as a film scanner, and more particularly, to a film clamp for holding a film extremely flat in a film gate in such apparatus.

BACKGROUND OF THE INVENTION

FIGS. 1–6 to which it is now made reference schematically represent a multiformat film clamp of the type described in commonly assigned copending application Ser. No. 906,635 filed on Jun. 30, 1992, entitled "Multiformat Film Clamp" and filed in the name of Eastman Kodak Company.

Reference is now made to FIG. 1 in which is shown an embodiment of the film clamp in the open (unclamped) position.

In this embodiment, there is a base plate 2 which has a fixed mount 7 attached to it. The fixed mount 7 supports a platen or a main clamp frame 9, which is pivotally mounted by two pins 8. The main clamp frame 9 is manually opened and closed by holding the relieved outboard corners 20 which act as handles. It is to be appreciated that the frame 9 does not have to be pivotally mounted to the base plate 2, but could be freely positioned over the base plate 2 or guided with vertical guides into clamping alignment with the base plate 2.

Pivotally mounted to the inside opening of the main clamp frame 9 is a gimbal frame 11. Two pins 10 allow the gimbal frame 11 to rotate about an axis parallel to the main clamp frame 9's pivot axes, defined by pins 8 to provide a first degree of freedom.

Pivotally mounted to the gimbal frame 11 is an insert frame 13, which is pivotally mounted by two pins 12. The two pins 12 allow the insert frame 13 to rotate perpendicular to the main clamp frame 9's pivot axis to provide a second degree of freedom.

A clamp insert 14 having an aperture opening 5 is snapped into the insert frame 13 with a pair of ball plunger detents not shown. This allows the operator to quickly change the clamp insert 14 for different formats.

Likewise, an aperture plate 3 is held in place via magnets (not shown) which are mounted slightly below the top surface of base 2.

The gimbal frame 11 provides for self aligning of the clamp insert 14 (an insert for 35 mm film is shown in FIG. 1) to the surface of the aperture plate 3, when the clamp frame 9 is rotated to the close position (as shown in FIG. 2).

The film 1 is located along its width by four positioning pins 4 which are fixed to the aperture plate 3. There are different size aperture plates and pin positions for different film formats. FIG. 3 illustrates an aperture plate 3 having an aperture opening 5 defined therein with positioning pins 4.

FIG. 4 illustrates the clamp insert 14 having two pairs of outwardly angled flexible strips 25, such as rubber, fixed about its aperture opening 5. The rubber strips are at equal heights above the clamp inserts top surface. Although the rubber strips 25 are shown fixed to the clamp insert they may alternately be affixed to the aperture plate or to both the aperture plate and to the clamp insert. Openings 21 are provided in the clamp insert for receiving the positioning pins 4 when the clamp is closed.

Typically, in such a film clamp, said rubber strips 25 are comprised of a flat strip (FIG. 7) with an angle (typically 60°) on one surface 26. As shown in FIG. 4, said pair of rubber strips 25 are contained in four locating slots 21, 22, 23, and 24 located all around the aperture opening 5, said slots being slanted (typically 60°) with respect to the normal to the surface of the clamp insert, so that when the rubber strips 25 are inserted into said slots 21, 22, 23, and 24, each of said strips is angled outward from the aperture opening 5 so as to grip and tension a film positioned between said base plate and said platen when they are clamped together.

During clamping of the film strip 1 the rubber strips 25 compress and buckle outward from the center of the apertured opening 5 to provide the clamping and tensioning forces as illustrated in FIGS. 5 and 6 to the film 1.

Referring to FIG. 5, the film 1 is clamped and tensioned along the width and length edges of film area.

FIG. 6 illustrates that all edges of the film 1 are under the same clamping force $F_2 \sin \theta$ and same tensioning force $F_2 \cos \theta$. The force resistive to the motion of the film 1 at all edges is $\mu F2 \sin \theta$.

Note that, $\mu$ is the coefficient of friction between the film 1 and surface of the aperture plate 3. To function properly the following relation must be maintained:

$$F_2 \cos \theta > \mu F_2 \sin \theta$$

This allows the film 1 to move relative to the platen surface, but not relative to the tensioning clamp.

The clamping force is generated by rotating a cam knob 6 180° to the clamp position, similar to a window latch. The cam knob is pivotally mounted to the base 2 by a pivot shoulder screw 18, as seen in FIG. 2.

For convenience, film strip guides 17 are attached to each side of the base 2 to facilitate the holding of film strips by their edges.

Finally, both the gimbal frame 11 and insert frame 13 rotation can be limited by pins 19A and associated clearance holes 19B as illustrated in FIG. 1.

Such a film clamp, even if it provides a uniform clamping and tensioning form around the perimeter of the filing, exhibits some drawbacks. First of all, the slanted slots, either in the aperture plate, or in the clamp insert, or both cause some loss in the viewable area of film which is substantially reduced due to the angle formed by said locating slots. Then, with such a design of the rubber strips, any functional changes required for further development or optimization for holding untested media, mandate the manufacture of new clamp inserts with modified slot dimensions. Furthermore, the angled locating slots 21, 22, 23, and 24 are complex and expensive to machine, the depth of said angled slots requiring to be closely controlled so that said rubber strips can provide a uniform clamping and tensioning force around the perimeter of the film.

SUMMARY OF THE INVENTION

From the foregoing, it can be seen that it is a primary object of the present invention to provide a film clamp for applying tension forces in two directions along the plane of the film and which overcomes the problems set forth in reference to the prior art detailed above.

In one embodiment of the invention, the improved film clamp is comprised of:

a base plate having an aperture defined there through and over which a film strip is positioned in a plane;

a platen having a flat surface and an aperture defined therein and mounted to said base plate with the apertures of said base plate and said platen aligned with each other when the platen is clamped to the base plate; and flexible gripping means positioned around the periphery of the aperture of either said platen, said base plate or both, each of said flexible gripping means including a locating section arranged so as to be inserted into locating slots provided around the periphery of the aperture of either said platen, said base plate or both, said locating slots being, when said base plate and said platen are clamped together, substantially perpendicular to the plane of the film; and a gripping section angled with respect to said locating section so that, when said locating section is inserted into said slots, said gripping section is angled outward from the aperture(s) so as to grip and tension said film between said base plate and said platen when they are clamped together.

These and other objects of the present invention will become more apparent when taken in conjunction with the following description and drawings wherein like characters indicate like parts and which drawings form a part of the present description.

BRIEF DESCRIPTION OF THE DRAWINGS

FIG. 5 illustrates, in perspective view, the forces applied to a section of film in accordance with the film clamp of FIG. 1.

FIG. 6 illustrates in cross sectional view the film section of FIG. 5 positioned over an apertured platen.

FIG. 7 is an end view of a flexible gripping strip used in the film clamp of FIG. 1.

FIG. 8 is a end view of a flexible gripping means used the film clamp according the invention.

FIG. 10 is a view showing a comparison of the viewable area of a film in a film clamp according to the invention and in a film clamp according to the above mentioned related application.

DETAILED DESCRIPTION OF THE INVENTION

Figure 1:
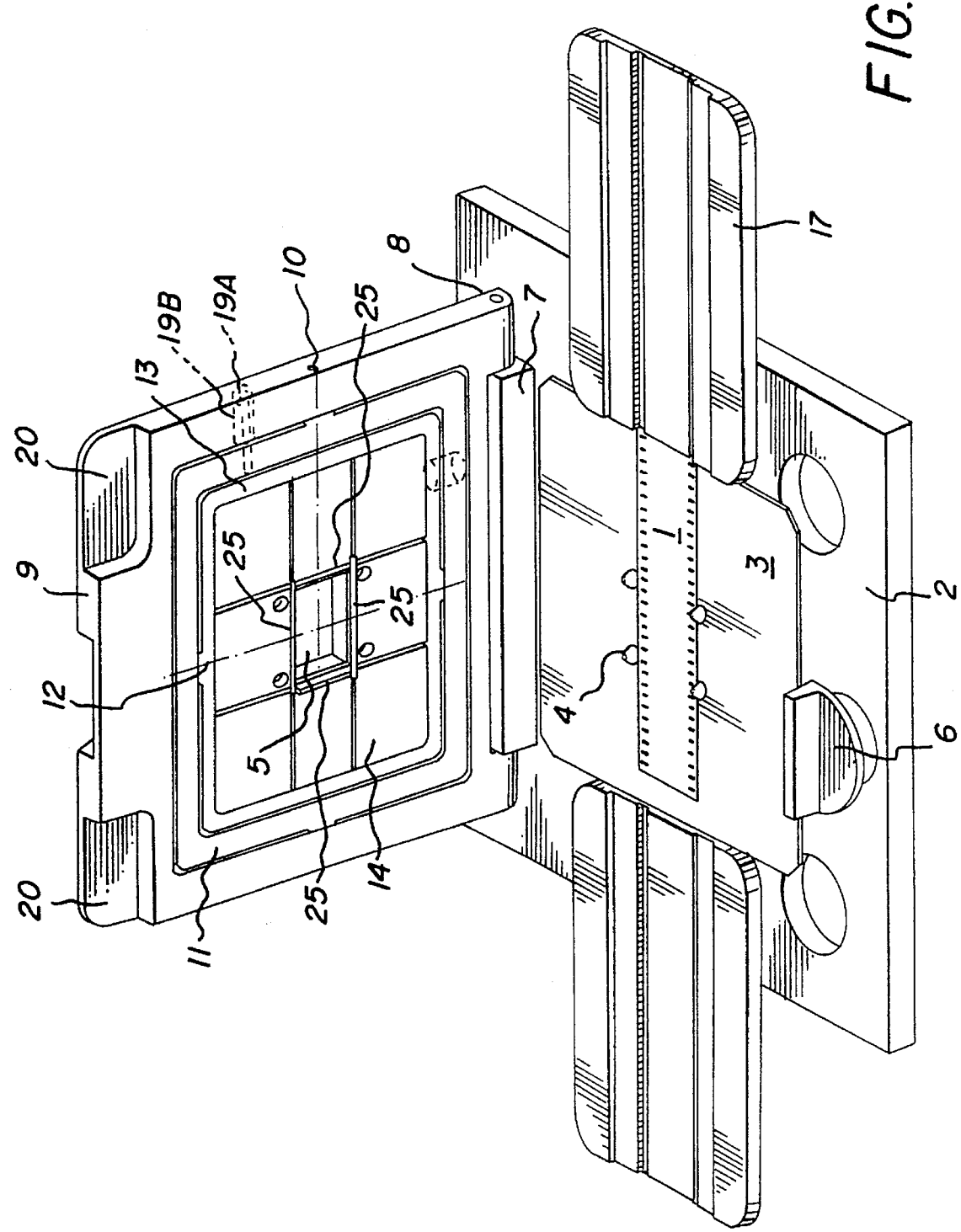
FIG. 1 is a perspective view of an embodiment of a film clamp, in the open position, as disclosed in the above mentioned related application.
Figure 2:
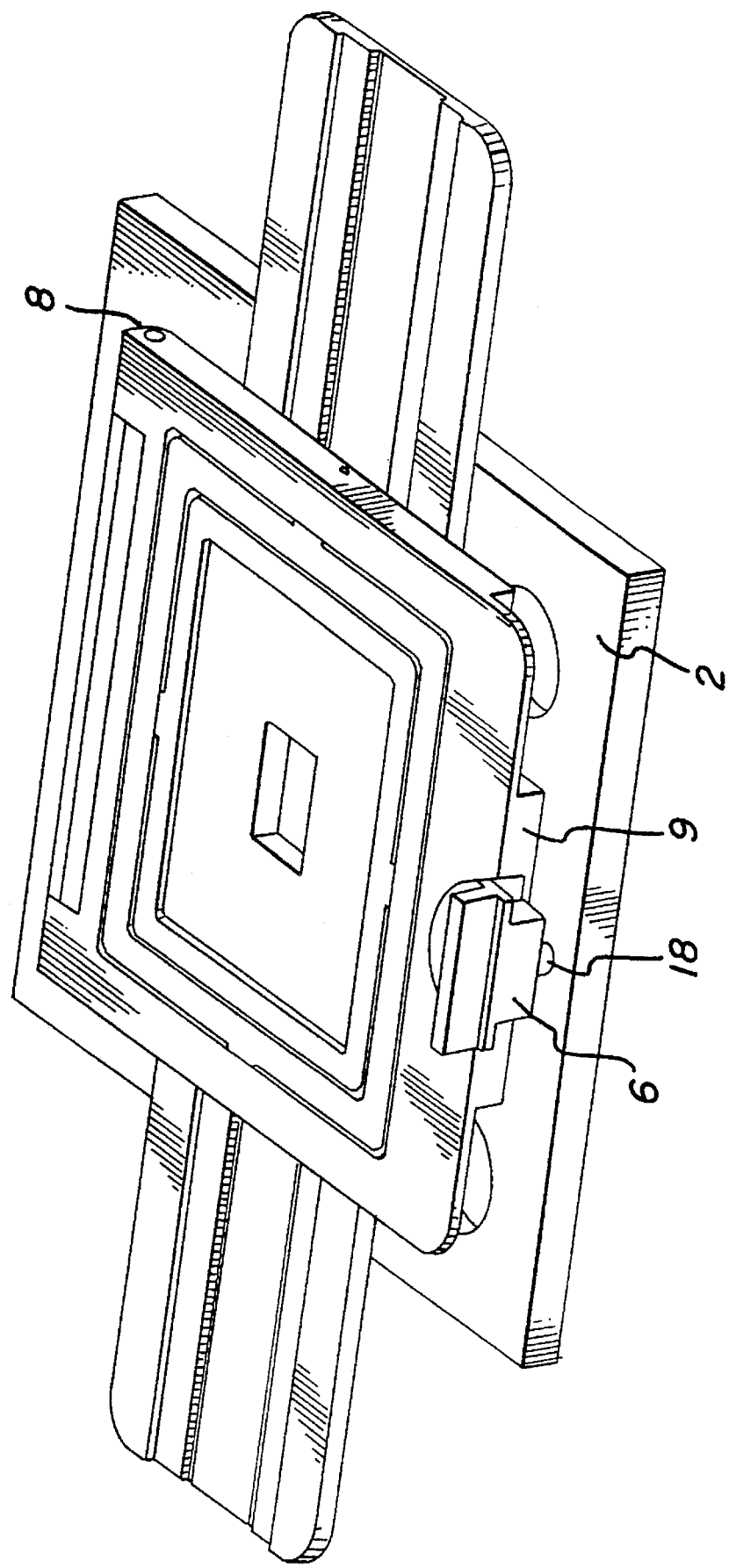
FIG. 2 is a perspective view of the film clamp of FIG. 1, in the closed position.
Figure 3:
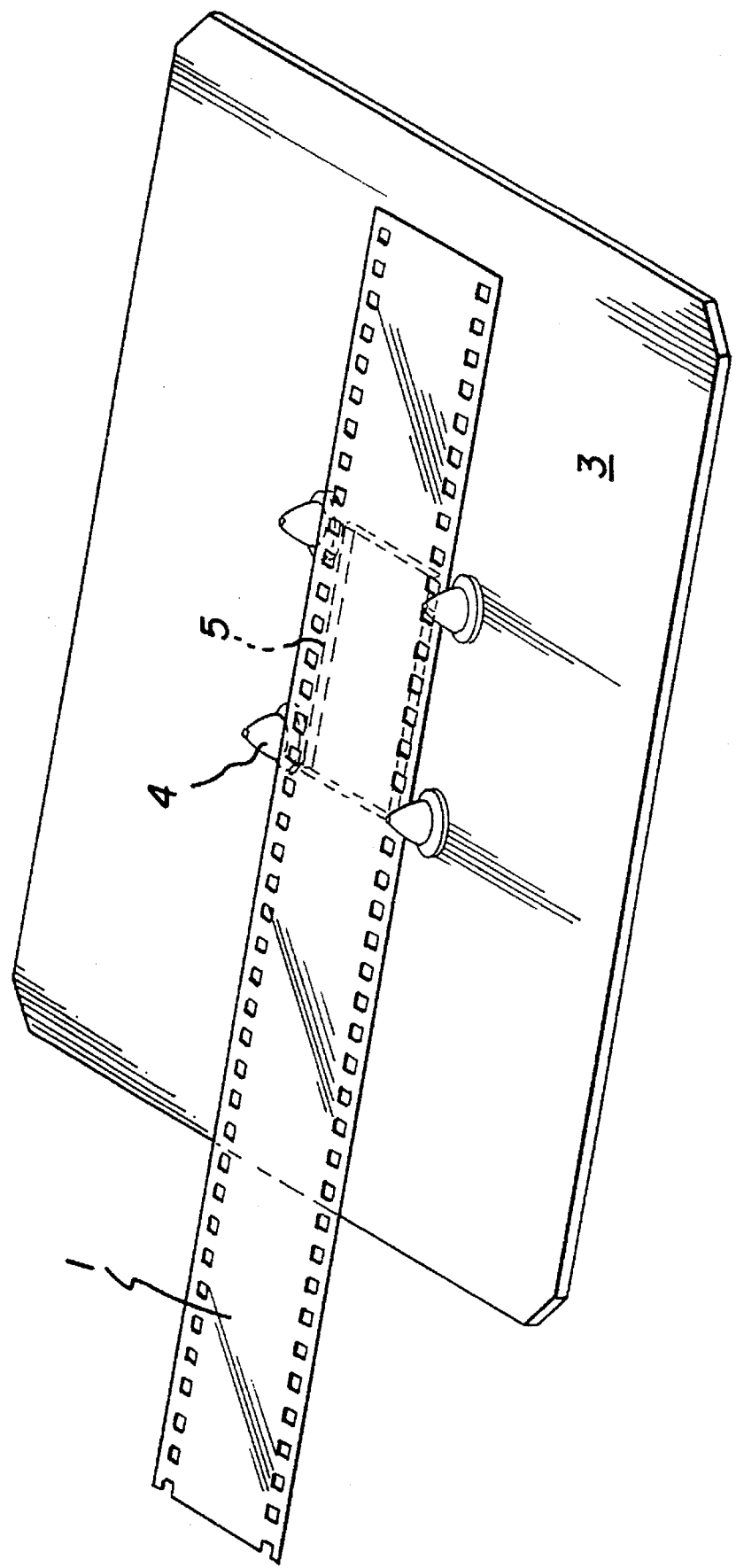
FIG. 3 illustrates a perspective view of an aperture plate for 35 mm film strips or cuts that is used in the film clamp of FIG. 1.
Figure 4:
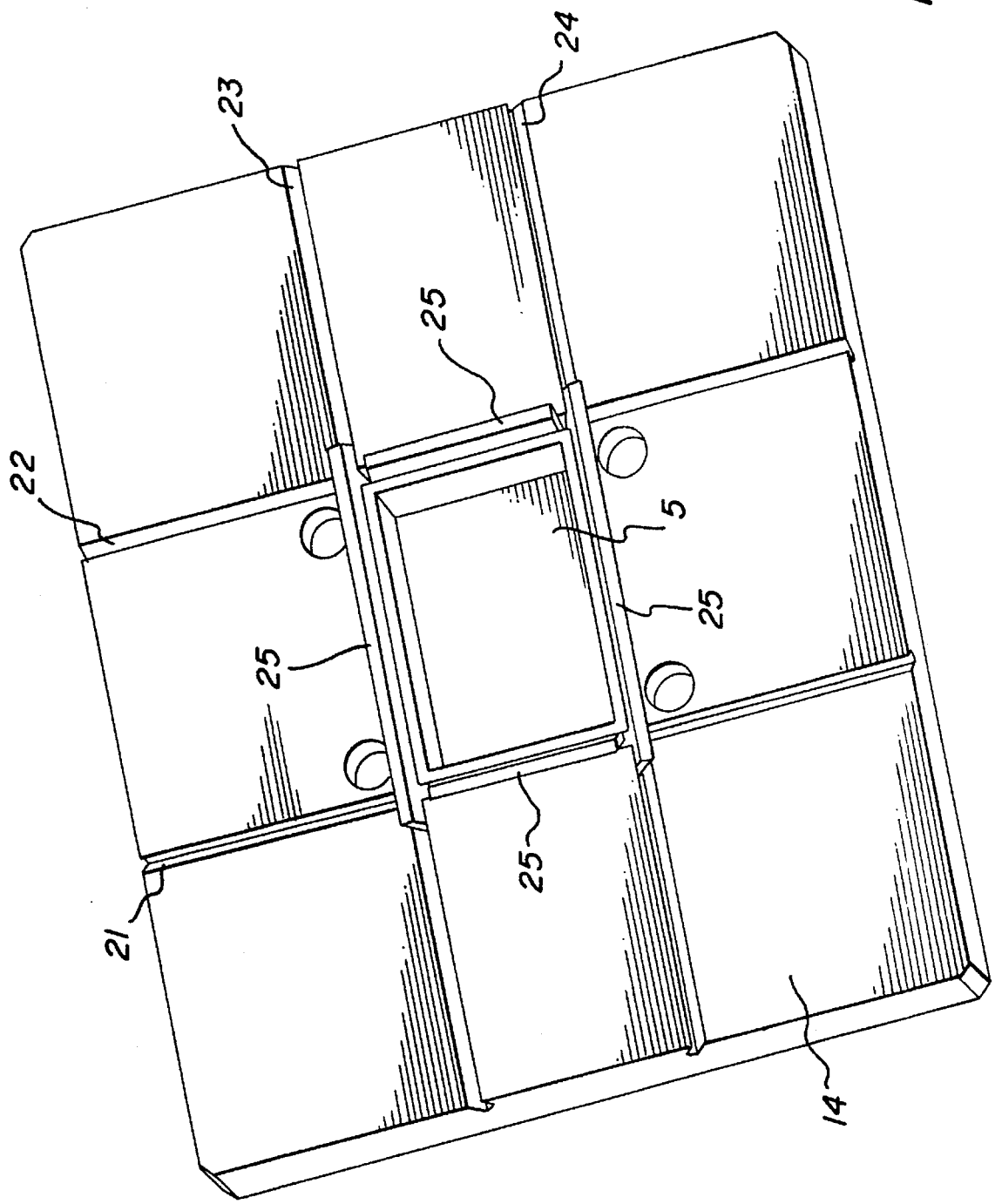
FIG. 4 illustrates a perspective view of an clamping plate insert assembly for 35 mm strips or cuts that is used in the film clamp of FIG. 1.

The film clamp according to the invention distinguishes over the film clamp described in reference to the prior art, mainly in the design of the flexible gripping means and in the mounting of said flexible gripping means on said film clamp which will be described in detail hereafter. The other parts of the film clamp are identical to the film clamp described in reference to FIGS. 1–6 and, accordingly, do not need any further description.

FIG. 8, to which it is now made reference shows an end view of a preferred embodiment of a flexible gripping means used in the film clamp according to the present invention.

Such a flexible gripping means 30 includes a locating section 31 arranged so as to be inserted into locating slots provided around the periphery of the aperture of either the clamp insert 14, the aperture plate 3 provided on the base 2 or both. Said slots will be described in more detail hereafter in reference to FIG. 9. The flexible gripping means 30 further comprises a rubber gripping section 32 angled with respect to said locating section 31 so that, when said locating section 31 is inserted into the above mentioned slots, said gripping section is angled outward from the apertures so as to grip and tension said film between the base plate 2 and the platen 9 when they are clamped together. Preferably, the gripping section 32 is angled with respect to said locating section 31 by an angle which ranges from 50° to 70°. A most preferred angle is of about 60°. In fact, the angle will depend on different parameters, such as the characteristics of the material forming the gripping means (coefficient of friction; flexural modulus), the stiffness of the film, the coefficient of friction of the film, the coefficient of friction of the surface of the aperture plate, etc. All these parameters, including the angle value, should be chosen in such a manner that the conditions discussed in reference to FIGS. 5 and 6 be met. According to the embodiment shown in FIG. 8, the gripping section 32 is laterally offset with respect to the locating section 31 so that the end of the angled gripping section 32 does not substantially extend beyond the plane defined by the corresponding side of the locating section 31. Such an arrangement reduces the loss in the viewable area of a film clamped in such a film clamp. Such flexible strips can be realized by using different techniques which are well known in the art. For example, the flexible strips can be extruded.

Figure 9:
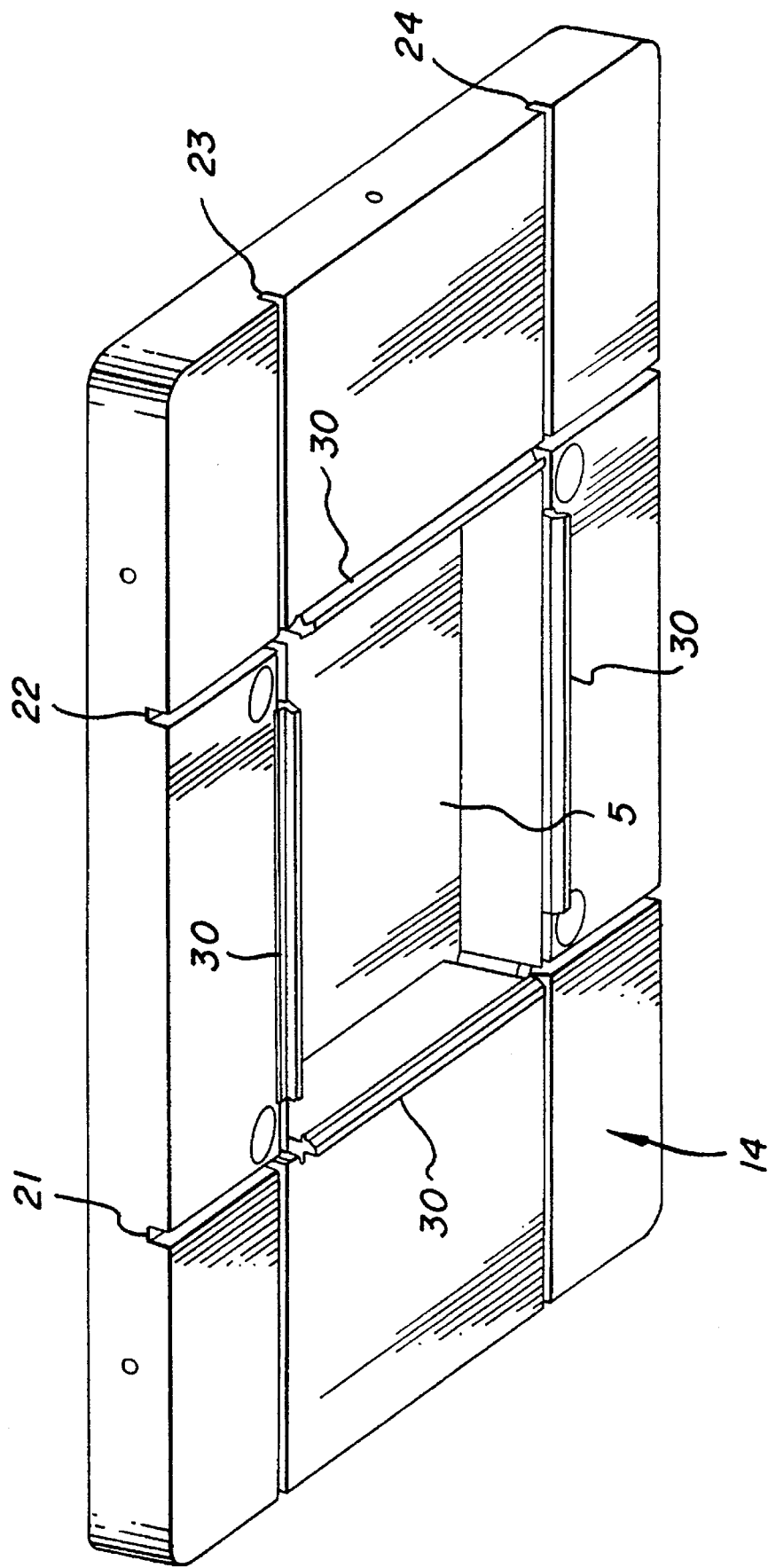
FIG. 9 illustrates a perspective view of a clamping plate insert used in the film clamp according to the invention.

FIG. 9, to which it is now made reference illustrates a perspective view of a clamping plate insert used in a preferred film clamp according to the invention. Said clamp insert 14 has two pairs of outwardly angled flexible gripping means 30, such as rubber, fixed about its aperture opening 5. The rubber strips are at equal heights above the clamp insert top surface. Said gripping means 30 are mounted on said clamp insert 14 by means of their locating sections 31 which are inserted into locating slots 21, 22, 23, and 24 provided all around the aperture opening 5, said slots being according to the invention, perpendicular to the plane of the clamp insert surface. In fact, when the platen 9 and the base plate 2 are clamped together, the locating slots, provided either in said clamp insert 14, in the aperture plate 3 or both, are perpendicular to the plane of a film strip mounted over said aperture plate 3. Although the rubber gripping means 30 are shown fixed to the clamp insert 14, they may alternately be affixed to the aperture plate or to both the aperture plate 3 and to the clamp insert, the same kind of straight slots being provided into said aperture plate 3. According to another embodiment for which the multiformat function is not required, the locating slots can be provided directly on said platen frame 9 and/or on said base plate 3, the removable clamp insert and the removable aperture plate being no longer necessary. Referring back to FIG. 8, the flexible gripping means according to a preferred embodiment of the present invention further comprises abutment means 33 provided on both sides of the locating section 31 for limiting the insertion depth of said locating section 31 into said locating slots. Due to this abutment means 33, the depth of the straight locating slots 21, 22, 23, and 24 does not need to be closely controlled in order to have the gripping means at equal heights above the clamp insert top surface. Accordingly, the machining of said slots is made easier.

As it appears from the foregoing description, the flexible gripping means according to the invention has been designed to isolate its two distinct functions: the location of the gripping means 30 which is ensured by the locating section 31 of the gripping means which fits into the above mentioned locating slots and the spreading action which is ensured by the gripping section 32, the geometry of which can be modified with little or no regard to the locating section 31.

Furthermore, as it appears in FIG. 10, to which it is now made reference, the viewable area $A_1$ of a film having a size B and clamped with gripping means 30 according to the invention is larger than the viewable area A (or clear aperture) of a film which is clamped with gripping means 25 according to the above mentioned related U.S. application Ser. No. 906,635.

While the invention has been described with particular reference to a preferred embodiment, it will be understood by those skilled in the art that various changes may be made and equivalents may be substituted for elements of the preferred embodiment without departing from invention. For example, as an alternative, said clamp insert can be mounted to said base plate rather than to said platen, appropriate means being provided to this end. In addition, many modifications may be made to adapt a particular situation and material to a teaching of the invention without departing from the essential teachings of the present invention.

Parts List for FIGS. 1–10

1. film
2. base plate
3. aperture plate
4. positioning pins (4)
5. aperture openings
6. cam knob
7. mount
8. pins (2)
9. platen
10. pins (2)
11. gimbal frame
12. pins (2)
13. insert frame
14. clamp insert
15. openings
17. strip guides
18. shoulder screw
19A. pins
19B. clearance holes
20. relieved outboard corners
21. locating slot
22. locating slot
23. locating slot
24. locating slot
25. rubber strips (prior art)
30. gripping means (invention)
31. locating section
32. gripping section

We claim:

1. An improved film clamp comprising:

a base plate having an aperture defined there through and over which a film strip is positioned in a plane:

a platen having a flat surface and an aperture defined therein and mounted to said base plate with the apertures of said base plate and said platen aligned with each other when the platen is clamped to the base plate; and flexible gripping means positioned around the periphery of the aperture of either said platen, said base plate or both, each of said flexible gripping means including an elongated locating section having parallel sides arranged so as to be inserted into locating slots having parallel side walls provided around the periphery of the aperture of either said platen, said base plate or both, the side walls of said locating slots being, when said base plate and said platen are clamped together, substantially perpendicular to the plane of the film strip; and a gripping section angled with respect to said locating section so that, when said locating section is inserted into said slots, said side walls of the locating slots closely engage and support the parallel sides of the elongated locating sections, thereby orienting the locating section such that said gripping section is angled outward from the aperture(s) so as to grip and tension said film strip between said base plate and said platen when they are clamped together, said flexible gripping means further being provided with abutment means for limiting the insertion depth of said locating section into said locating slots.

2. The improved film clamp according to claim 1, wherein said gripping section is angled with respect to said locating section by an angle which ranges from 50° to 70°.

3. The improved film clamp according to claim 1, wherein said flexible gripping means is provided with abutment means for limiting the insertion depth of said locating section into said locating slots.

4. The improved film clamp according to claim 1 and further comprising:

a clamp insert having an aperture there through and locating slots around the periphery of said aperture; and means for mounting said clamp insert to said platen with two degrees of freedom to provide for accurate alignment of said clamp insert with said base plate when the platen is clamped to said base plate.

5. The improved film clamp according to claim 4, wherein a plurality of clamp inserts are provided one for each size of film to be clamped.

6. The improved film clamp according to claim 4, wherein said means for mounting mounts said clamp insert to said base plate rather than to said platen.

7. The improved film clamp according to claim 4, wherein said means for mounting is comprised of:

a gimbal;

a pair of pivot pins mounting said gimbal to said platen about a first axis of freedom; and a second pair of pivot pins mounting said clamp insert to said gimbal about a second axis of freedom.

8. The improved film clamp according to claim 1 and further comprising:

an plurality of aperture plates of different sizes, one for each size film to be clamped;

means for removably affixing said aperture plates one at a time to said base plate.

9. The improved film clamp according to claim 8 and further comprising a plurality of guide pins removably mounted to said aperture plates to guide said film into position over said aperture.

10. The improved film clamp according to claim 7 and further comprising:

an insert frame pivotally mounted to said gimbal with said clamp insert removably mounted to said insert frame.

11. An improved clamp comprising:

a base member having a relatively flat surface and an aperture therein over which a film strip is positioned;

a platen member having an aperture there through;

gripping means positioned around the periphery of the aperture of either said base member, said platen member or both, each of said gripping means including an elongated locating section having parallel sides arranged so as to be inserted into locating slots having parallel side walls provided around the periphery of the aperture of either said base member, said platen member or both, the side walls of said slots being when said base member and said platen member are clamped together, substantially perpendicular to the plane of the film; and a gripping section, angled with respect to said locating section so that, when said locating section is inserted into said locating slots, said side walls of the locating slots closely engage and support the parallel sides of the elongated locating sections, thereby orienting the locating section such that said gripping section is angled outward from the aperture(s) so as to grip and tension said film between said base member and said platen member when they are clamped together, said gripping section further being provided with abutment means for limiting the insertion depth of said locating section into said locating slots; and means for clamping said platen to said base member with said apertures in alignment so as to provide a tension in the film along all sides of the aperture as clamping pressure is applied.

12. The improved film clamp according to claim 11, wherein said gripping section is angled with respect to said locating section by an angle which ranges from 50° to 70°.

13. The improved film clamp according to claim 11, wherein said gripping section is provided with abutment means for limiting the insertion depth of said locating section into said locating slots.

14. The improved film clamp according to claim 11 and further comprising:

a clamp insert having an aperture there through and locating slots around the periphery of said aperture; and means for mounting said clamp insert to said platen member with two degrees of freedom to provide for accurate alignment of said clamp insert with said base member when said platen member is clamped to said base member.

15. The improved film clamp according to claim 14, wherein a plurality of clamp inserts are provided, one for each size of film to be clamped.

16. The improved film clamp according to claim 14, wherein said means for mounting mounts said clamp insert to said base member rather than to said platen member.

17. The improved film clamp according to claim 14, wherein said means for mounting is comprised of:

a gimbal;

a pair of pivot pins mounting said gimbal to said platen member about a first axis of freedom; and a second pair of pivot pins mounting said clamp insert to said gimbal about a second axis of freedom.

18. The improved film clamp according to claim 11 and further comprising:

a plurality of aperture plates of different sizes, one for each size film to be clamped;

means for removably affixing said aperture plates one at a time to said base member.

19. The improved film clamp according to claim 18 and further comprising a plurality of guide pins removably mounted to said aperture plates to guide said film into position over said aperture.

20. The improved film clamp according to claim 17 and further comprising:

an insert frame pivotally mounted to said gimbal with said clamp insert removably mounted to said insert frame.

* * * * *